(12) United States Patent
Baker (10) Patent No.: US 6,651,378 B2
(45) Date of Patent: Nov. 25, 2003

(54) BAIT STATION FOR INSECTS

(76) Inventor: Stanley Z. Baker, 4978 61$^{st}$ Ave. South, St. Petersburg, FL (US) 33715

( * ) Notice: Subject to any disclaimer, the term of this patent is extended or adjusted under 35 U.S.C. 154(b) by 0 days.

(21) Appl. No.: 09/858,086

(22) Filed: May 15, 2001

(65) Prior Publication Data

US 2001/0054249 A1 Dec. 27, 2001

Related U.S. Application Data

(60) Provisional application No. 60/204,718, filed on May 16, 2000, provisional application No. 60/226,653, filed on Aug. 21, 2000, and provisional application No. 60/231,605, filed on Sep. 11, 2000.

(51) Int. Cl.$^7$ ............................................. A01M 1/20
(52) U.S. Cl. .......................................... 43/131; 43/121
(58) Field of Search ................................ 43/131, 132.1, 43/121; 239/44, 47, 145

(56) References Cited

U.S. PATENT DOCUMENTS

| | | | | |
|---|---|---|---|---|
| 140,954 A | * | 7/1873 | Rubarth | 43/121 |
| 944,568 A | * | 12/1909 | Mercer | 43/121 |
| 995,207 A | * | 6/1911 | Watkins | 43/121 |
| 1,573,278 A | | 2/1926 | Schlesinger | |
| 1,960,464 A | * | 5/1934 | Thalheimer | 43/131 |
| 2,435,317 A | * | 2/1948 | McGrew | 43/121 |
| 2,554,302 A | * | 5/1951 | Keskitalo | 239/44 |
| 4,228,614 A | * | 10/1980 | Cardarelli | 43/131 |
| 4,563,836 A | | 1/1986 | Woodruff et al. | |
| 4,837,969 A | | 6/1989 | Demarest | |
| 5,033,229 A | * | 7/1991 | Demarest et al. | 43/131 |
| 5,501,034 A | * | 3/1996 | Hazan | 43/132.1 |
| 5,548,922 A | * | 8/1996 | Wefler | 43/131 |
| 5,746,021 A | | 5/1998 | Green | |
| 5,749,168 A | * | 5/1998 | Chrysanthis | 43/131 |
| 5,802,761 A | | 9/1998 | Demarest et al. | |
| 5,875,586 A | * | 3/1999 | Ballard et al. | 43/131 |
| 5,966,863 A | | 10/1999 | Payton et al. | |
| 6,023,884 A | * | 2/2000 | Yanohara | 43/132.1 |
| 6,041,542 A | * | 3/2000 | Payton et al. | 43/131 |
| 6,164,010 A | * | 12/2000 | Snell et al. | 43/131 |
| 6,189,259 B1 | * | 2/2001 | Soller | 43/131 |
| 6,195,933 B1 | * | 3/2001 | Woodruff | 43/131 |
| 6,216,384 B1 | * | 4/2001 | Dickson et al. | 43/131 |
| 6,237,276 B1 | * | 5/2001 | Storelli | 43/131 |
| 6,272,791 B1 | * | 8/2001 | Pleasants | 43/131 |
| 6,370,813 B1 | * | 4/2002 | Nelson et al. | 43/131 |
| 6,502,348 B2 | * | 1/2003 | Bernard | 43/131 |

* cited by examiner

*Primary Examiner*—Darren W. Ark
(74) *Attorney, Agent, or Firm*—D. Peter Hochberg; Katherine R. Vieyra; Sean Mellino (57) ABSTRACT

A refillable bait station for containing and holding a bait for insects. The bait is stored in an interior chamber of the invention. A ramp extending from beneath the station allows the insects to reach the bait within the bait station. The ramp is supported by a pyramidal shaped housing having tapering sidewalls that allow the insects to descend to the level of the bait. A floating feeding pad extending from the periphery of the housing allows the insects to access the bait without the risk of becoming trapped. The station can be secured to the ground by a security stake having a plurality of retaining members thereon or to a dry, hard surface with double-sided adhesive tape. A tamper resistant filling cap allows the station to be refilled through an access aperture equipped with a spill proof shield.

48 Claims, 11 Drawing Sheets

BAIT STATION FOR INSECTS

This Appln claims benefit of Prov Nos. 60/204,718 May 16, 2000, 60/226,653 filed Aug. 21, 2000 and 60/231,605 filed Sep. 11, 2000.

BACKGROUND OF THE INVENTION

1. Field of the Invention

The present invention relates generally to insect bait stations. More particularly, the present invention relates to an insect bait station for containing a toxic bait, or alternative types of bait, for attracting ants and other insects and preventing their drowning to enable them to return to their nests so other insects can be subjected to the toxic bait.

2. Description of the Prior Art

There exists in the art many devices that supply toxic bait for means of controlling insects. Many of these devices utilize a solid bait contained in a reservoir. For example, U.S. Pat. No. 4,563,836 (Woodruff et al.) discloses an insect bait station having a base portion, and further having outer and inner walls with openings therethrough to allow insect passage. All of these features are formed as a unitary piece of a flat, deformable sheet of plastic or other material. A cover is provided to enclose all of these features, while maintaining all portions of the cover elevated above wall apertures to facilitate unobstructed insect passage. The bait is a solid or paste, shaped into the form of a wafer, and affixed to the floor of the inner compartment.

U.S. Pat. No. 5,746,021 (Green) describes a fire ant station having a body portion which includes a reservoir defined by an enclosed wall and a floor and having an open-ended internally directed collar defined in the floor. A probe is received within the collar in a locked, frictional engagement therewith, and is adapted to be inserted into a fire ant mound. The probe includes a tubular shaft with multiple perforations and an internal longitudinal channel formed therein and a pointed tip. The perforations provide to ants access to the reservoir and thus to the bait therein.

U.S. Pat. No. 5,802,761 (Demarest et al.) describes a bait station for crawling insects and a method for presenting bait to targeted insects. The bait station includes a base and a cover fastened to the base. The base includes a bait cup with a bait cup wall. The method of the invention includes providing such a bait station, containing a selected bait on a surface where targeted insects crawl.

U.S. Pat. No. 4,837,969 (Demarest) discloses an insect bait station which can be manufactured and packaged in blister pack arrays, each station having an apertured, multi-lobed cover which is fitted over a base having a central bait well. The central bait well is formed by a ramped structure and inner walls. The inner walls intersect the ramped structure, which serves as a guide to direct an insect toward the bait.

There are also bait stations for crawling insects utilizing a liquid bait and toxicant. For example, U.S. Pat. No. 5,548,922 (Wefler) describes an insect liquid bait station that includes a base having a floor and peripheral dike that together define a reservoir for a slow-kill liquid insecticide. A porous pad sits in the pooled liquid on the floor of the reservoir. A cover is mounted in liquid tight relation on the base. The cover has an inclined ramp leading down to a central stage area with access portals through which the target insects can enter and feed on the poisonous liquid on the porous pad. The tight mounting of the cover to the base and the use of a porous pad immediately beneath the access ports resist spillage of the liquid bait.

U.S. Pat. No. 5,875,586 (Ballard et al.) provides a method and apparatus that dispenses a liquid to a liquid bait station in a refillable manner. The invention provides a transparent bait station that is mounted to a structure. A liquid bait is injected into the bait station to initially fill the bait station. The bait station is a refillable bait station and the bait is a slow acting toxicant and attractant.

U.S. Pat. No. 5,033,229 (Demarest et al.) describes a liquid bait station for roaches. The bait station has a base structure that includes a central well area within an absorbent pad and a plurality of insect access openings in sidewalls surrounding the well area. The bait station also has a funnel-like reservoir seated in the base structure and tapering to a narrow opening at its bottom for controllably releasing liquid bait onto the absorbent pad in the central well area. The larger upper end of the funnel-like reservoir has a cover.

U.S. Pat. No. 5,966,863 (Payton et al.) describes a liquid bait station for ants with separate nested inner and outer container sections with the container forming a liquid bait reservoir. The inner container section or reservoir has a lid that is closed whenever the outer container is closed, and access to the reservoir of liquid bait by the ants is indirect via one or more container access ports leading to a compartment inside the outer container and then via separate reservoir access ports leading from the compartment to the reservoir.

U.S. Pat. No. 1,573,278 (Schlesinger) includes a central well for holding a liquid insect poison and a hollow, cylindrical wick that lines and extends upwardly from the sides of the well to a cover. Liquid can soak through the wick to wet a fringe that surrounds the wick and is exposed to feeding ants. The wick is closed by the cover, which also extends over the rest of the bait station. The wick, together with the cover, is intended to prevent spillage of the liquid poison, should the device be turned on its side. The cover, together with the base, provides an enclosed feeding chamber surrounding the well and its cylindrical wick.

SUMMARY OF THE INVENTION

The present invention is an insect bait station, especially for ants for containing and holding a fast or slow acting bait, particularly for attracting ants and other insects. The bait station, in its preferred form, and when used with liquid or gel bait utilizes a floating feeding pad to prevent insects from drowning in the liquid bait as the insects feed. There are many reasons why it may be desirable to attract insects with such a bait station. For example, one may want to attract insects to study insect populations, insect migration patterns, use in research, or to exterminate them. Although the bait station may be used to attract many types of insects, it may also be used to attract and exterminate insects when the bait is used in combination with an insect toxicant or poison. The bait station may also be used to attract insects for extermination purposes where an external poison or extermination method is used.

For example, a sugar and water solution may be used as bait inside the station to attract the insects. A well-known non-toxic insecticide such as silicon dioxide or diatomaceous earth may be dusted outside the so insects can crawl over it when traveling to the bait station. The silicon dioxide powder or dust clings to the underside of the insect and cuts into it, eventually causing death.

The bait station, in its preferred form, is composed of a lid and a base portion defining an interior chamber. The bait is poured into the interior chamber by opening a filler cap mounted on the lid. A channel formed in the base allows the insects access to the interior chamber. A ramp extends from beneath the base through the channel and into the interior chamber. The ramp allows the insects access to the interior chamber up through the channel. The housing of the channel is a truncated pyramid shape wherein the interior sidewalls taper outwardly as the sidewalls descend to the floor of the base. A floating feeding pad is secured to the upper surface of the housing by a securing means such as a gasket and/or a plurality of apertures preformed in the pad which are placed over posts protruding from the upper surface of the housing. A section of the feeding pad, known as a leaf, extends outwardly from a central portion of the pad that is fitted on the upper surface of the housing. One leaf from the pad extends from each side of the perimeter of the housing into the liquid bait in the interior chamber. The pad is made of a material that floats and can be absorbent or non-absorbent. Insects having gained access into the bait station may crawl onto the floating pad and consume bait without falling into the bait and becoming trapped or drowning. The floating feeding pad continuously provides a surface that the insect can cling to while consuming the toxic bait, without falling into the liquid and drowning. The pad further allows the insects to access the liquid bait for consumption, even as the level of the liquid bait within the interior chamber decreases. The leaves of the floating pad rise and fall as the level of the liquid bait rises and falls.

In its preferred embodiment, the bait station also employs an insert tray for the holding and dispensing of the bait. Each leaf of the feeding pad extends into the tray to allow the insects to access the bait. The tray is sectioned so that a plurality of types of bait may be employed. The insert tray is removable so that it can be cleaned or replaced. It is appreciated that the bait station can be employed without the insert tray when only a single type of bait is being used. In this embodiment, bait is placed directly into the bait station base.

The sidewalls of the base may be translucent so that the amount of bait in the interior chamber can be seen. Alternatively, a dipstick may be employed to ascertain the amount of bait remaining in the bait station. An additional channel is formed in the forwarded sidewall of the channel housing for receiving therethrough a security stake for securing the bait station to the ground. Alternatively, for surfaces where the security stake may not be suitable for use, a plurality of projections are provided on the lower surface of the bottom wall for attaching the station to dry, hard surfaces. Double-sided tape can optionally be provided on the free end of each of the projections for securing the bait station to the surface. All that is required to attach the station to a surface is to remove the backing from the tape and press the station firmly on the surface. Examples of places where the station may be placed with the double-sided tape include indoors, as well as outdoors in places such as garages, patio or porch floors, sheds, and walkways, especially near doors.

It is an object of the invention to provide an improved bait station for insects.

It is another object to provide a bait station for insects having an interior chamber for holding the bait.

Another object is to provide an insect bait station where a liquid bait can be employed in a less hazardous manner in areas where children and pets may have access to the station.

Another object of the present invention is to provide an insect bait station employing a bait that can easily be refilled after the bait in the interior chamber has been consumed by the insects.

Another object of the present invention is to provide a locking, tamper-resistant filler cap that can be opened to add additional bait to the bait station.

It is still a further object an insect bait station with a base and cover which are selected to prevent children and pets from opening a bait chamber therein.

Another object of the present invention is to provide a spill-proof shield around the fill opening to prevent the spilling of bait when the station is being refilled.

Another object of the present invention is to provide an apparatus for securing the station to a surface to keep the station in place, and especially to prevent children and pets from picking the station up and possibly being exposed to the bait.

Another object of the present invention is to provide a device for the insects to access the bait in the interior chamber and a means for exiting.

Another object of the present invention is to provide a bait station for holding a bait toxicant for insect consumption whereby the insect carries the bait back to the insect colony or nest for further dispersion among other insects, and in the case of ants, to the particular colony queen ant and young to exterminate the insects and control the ant population.

Yet a further object of the present invention is to provide a liquid toxic bait insect station where insects are prevented from drowning so that they carry toxic bait back to their nests for other insects to consume.

Another object of the present invention is to provide a floating feeding pad made from a material that floats at or below the level of bait.

Another object of the present invention is to provide a floating feeding pad so insects can access the liquid bait without becoming trapped.

Still yet another object of the present invention is to provide a multi-sectional, reusable insert tray for holding and dispensing the toxic bait.

The foregoing and other objects of the invention are achieved by a bait station having an interior chamber for containing and holding a bait for attracting insects. The bait can be any special or generic formulation that attracts the insects. The bait station has an apparatus whereby the insects can enter the interior chamber to access the bait. The bait is refillable after consumption by the insects by a refill device located in the lid of the station. A specially formed feeding pad that floats in the liquid bait provides a support for insects to access the liquid bait without drowning. As an added safety feature for the concern of children and animals, the lid of the station is removable coupled via a screw, preferably a "hex" type screw, to the base of the station to prevent small children and animals from opening the station and gaining access to the toxic bait. A security stake is provided for anchoring the station to the ground.

DESCRIPTION OF THE PREFERRED EMBODIMENTS

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details.

Figure 1:
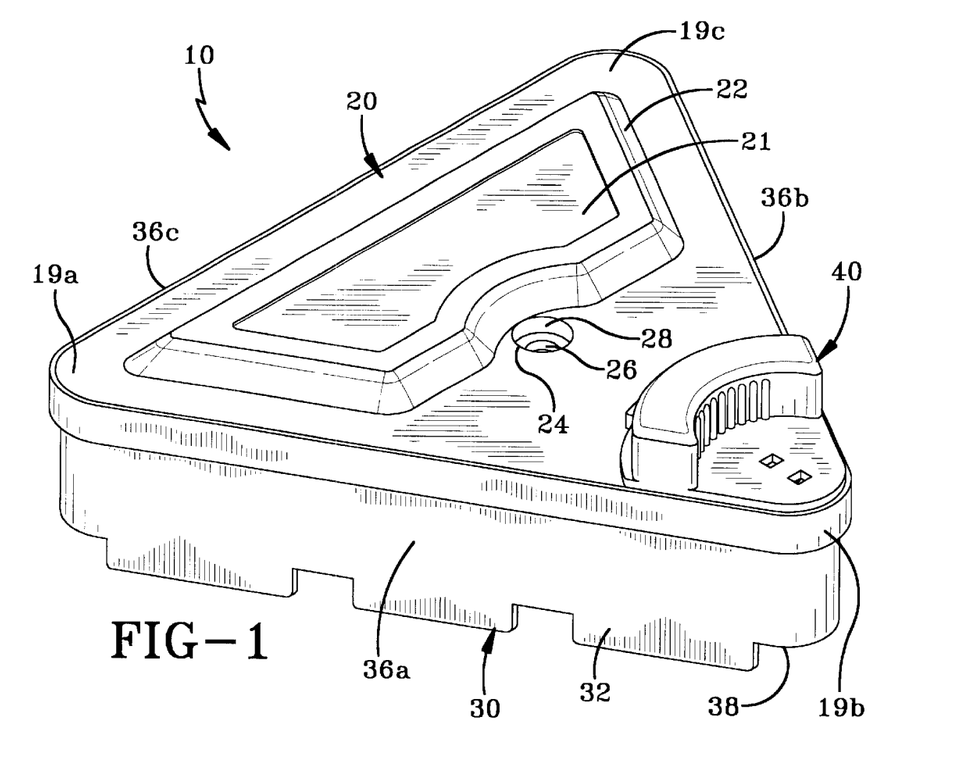
FIG. 1 is a perspective view of the preferred embodiment of a bait station according to the present invention.

Referring now to FIG. 1, a preferred embodiment of a bait station according to the present invention is shown and referred to generally at numeral 10. In this embodiment, bait station 10 comprises essentially a bait station lid 20, a bait station base 30, bait station sidewalls 36a, b, c and a bait station bottom wall 38. Bait station 10 is essentially a triangularly shaped planform with a finite thickness. In the preferred embodiment, corners 19a, b, c of bait station sidewalls 36a, b, c have a rounded configuration. However, it should be appreciated that corners 19a, b, c may be of angled or squared dimensions. Bait station 10 further consists of a plurality of legs 32 extending downwardly from bait station base 30 and attached at selected positions on the outer periphery of bait station base 30.

Bait station 10 is designed to be strategically placed by users, such as professional exterminators, in locations where it is desirable to attract insects, for insect extermination or other purposes. In a preferred embodiment, bait station 10 is of an opaque or translucent appearance. Such low profile of bait station 10 makes it ideal for securement along walls without attracting children or animals. Because insects may enter a dwelling via cracks in walls, bait station 10 may be secured along dwelling walls or corners to facilitate insect attraction and trapping. Bait station 10 is a stand-alone device that is preferably secured to horizontal surfaces. Furthermore, the design of bait station 10 is of relatively low cost so that a plurality of stations 10 may be employed to achieve a maximum effect.

It is also appreciated that bait station 10 components may be formed of plastic materials, unless otherwise specifically noted, utilizing injection molding techniques or stamping methods, or any other method that is well known in the art. For example, bait station 10 may be made by injection molding polypropylene. It is desirable that bait station 10 material be translucent to facilitate a user seeing into bait station 10 for determining amount of bait remaining. It is noted that the preferred embodiment is exemplary and other construction materials, such as paper, cardboard, or metal may alternatively be employed.

Figure 1A:
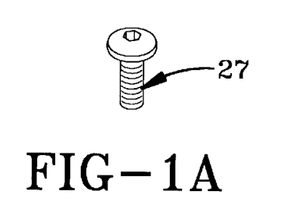
FIG. 1a is a perspective view of a threaded connector for inserting into the lid of the bait station shown in FIG. 1.
Figure 1B:
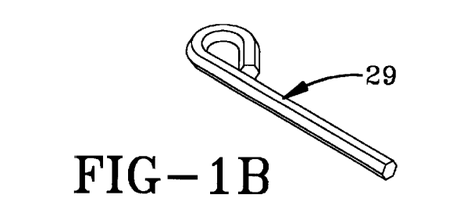
FIG. 1b is a perspective view of a tool, preferably a "hex" type wrench, for opening bait station according to the invention shown in FIG. 1.

In a preferred embodiment, bait station lid 20 is removably coupled with bait station base 30 in a snug fashion so that bait station lid 20 is substantially flush with bait station base 30. Dimensions of bait station lid 20 substantially correspond to dimensions of bait station base 30. Bait station lid 20 further consists of a lid aperture 24 with a channel 26 therein. Channel 26 extends downwardly from bait station lid 20 into bait station base 30, and is in alignment with a threaded bore in base 30 as discussed below. A securing means, such as a threaded Allen head post or 27 (FIG. 1a), is inserted at lid aperture 24 into channel 26. A post recess or countersink 28 is formed with lid aperture 24 therein to receive the head of threaded post 27. It is desirable that threaded post 27 is such that it can only be removed by a particular removing means specific to the threaded post 27 that is employed, such as an Allen head wrench 29 (FIG. 1b). Such securing means will secure bait station lid 20 to bait station base 30 and prevent accidental opening of bait station 10 by children or animals. However, a user may remove threaded post 27 via a threaded post-specific removal implement, such as wrench 29, so that bait station lid 20 can be removed from bait station base 30 for purposes of feeding pad 90 replacement or bait station 10 cleaning.

In an alternative embodiment, bait station lid 20 and bait station base 30 may be assembled together via known plastic assembly methods, such as sonic welding. Sonic welding bonds abutting plastic components together by heating the abutting areas with sonic vibrations until such areas are fused.

A raised area 22 is formed on base station lid 20 for the placement of required warnings by the Environmental Protection Agency ("E.P.A.") as to the dangers of the bait and/or toxicant contained in the bait station 10. An example is label 21, which contains such information as the requisite E.P.A. regulation number, brand name of the contents, and the active ingredient(s) of the contents and the percentages thereof.

Figure 2:
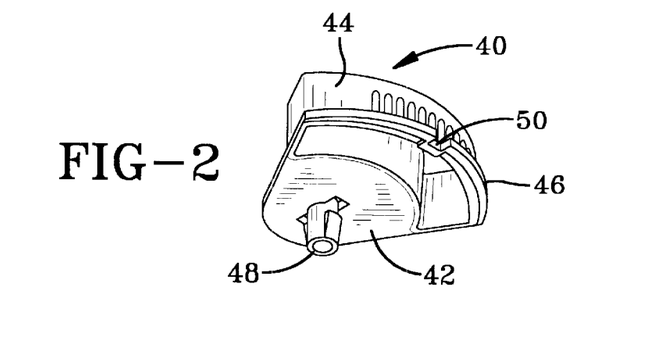
FIG. 2 is a perspective view of the under side of the filler cap of the invention as shown in FIG. 1.
Figure 3:
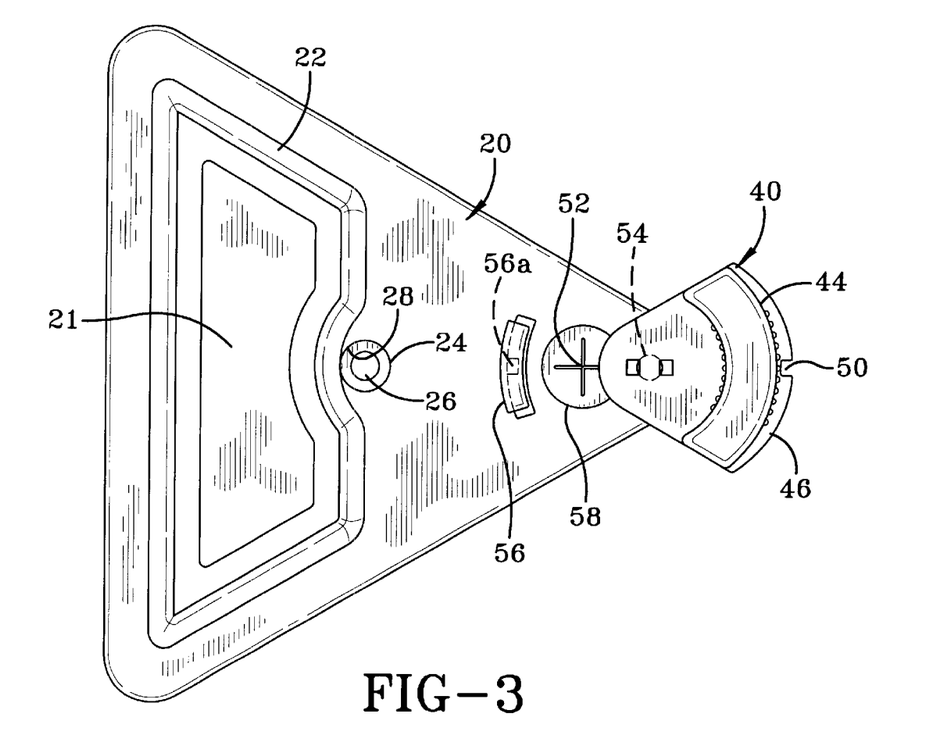
FIG. 3 is a top view of the lid of the invention as shown in FIG. 1.

Referring now to FIG. 2, the underside of a bait station lid filler cap is shown in detail and referred to generally at numeral 40. Filler cap 40 is pivotally coupled to base station lid 20 via a cap prong 48. Prong 48 is pivotally coupled to base station lid 20 at cap prong aperture 54 (FIG. 3). Filler cap 40 seals filling aperture 52 (FIG. 3) when in a closed position. While in an open position, a user is able to place bait into bait station 10 via filling aperture 52. An upstanding curved inverted L-shaped guide 56 located on the side of filling aperture 52 and a prong aperture 54 on the opposite side of aperture 52 engages a cap tab 46 on filler cap 40 for guiding the movement of filler cap 40 as it rotates about aperture 52 between the open and closed positions.

Figure 3A:
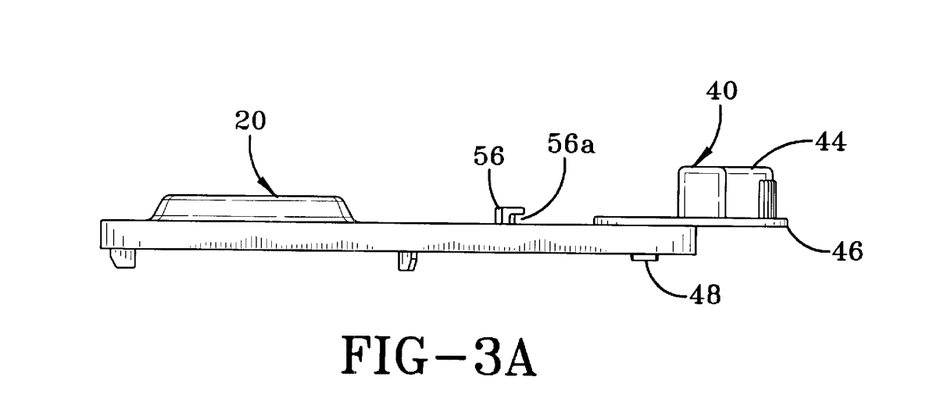
FIG. 3a is a side view of the lid of the invention as shown in FIG. 1.

Filler cap 40 includes a substantially triangular shaped underside 42 and prong 48 extends downwardly therefrom. Projecting upwardly from the end opposite that of prong 48 is a semi-circular shaped gripper bar 44 for allowing a user to grasp filler cap 40 and to move it between the open and closed positions. Application of pressure in an inwardly direction with the simultaneous application of pressure in either a leftward or rightward direction allows a user to rotate filler cap 40 about prong 48 and into an open position. Being in an open position exposes filling aperture 52 and allows user to insert bait into bait station 10. Rotating filler cap 40 about prong 48 into a closed position seals bait within bait station 10 within the interior chamber 70. A tab 46 is located on the outer radius of gripper bar 44 for engagement with an L-shaped guide 56, located on upper surface of bait station lid 20. A small notch 50 is located in the center of the outer radius of tab 46 for engaging a complementary track projection 56a (FIG. 3) located at the center of the inner radius of track 56. In FIG. 3a, a side view of bait station lid 20 is shown, specifically illustrating the distinct L-shape of guide 56 and guide projection 56a. As filler cap 40 is pivoted about prong 48, L-shaped guide 56 guides tab 46 and filler cap is kept in alignment as it traverses between the open and closed positions. When filler cap is in the closed position, notch 50 engages projection 56a, locking filler cap 40 in the closed position. Filler cap 40 will remain in the closed position until pressure is placed on gripper bar 44 in an inward direction, and notch 50 is disengaged from projection 56a. Filler cap 40 is now free to pivot about prong 48, thus exposing filling aperture 54.

Filler cap 40 is pivoted back over filling aperture 52 via L-shaped guide 56 so that tab 46 re-engages with projection 56a. Such locking mechanism prevents children from rotating filler cap 40 into an open position. It is recognized by the federal government that young children have difficulty doing two functions at the same time, such as the dual applications of pressure needed to rotatably open filler cap 40. The gripper bar 44 of the present invention requires a simultaneous dual motion of "squeezing" and "twisting" with the same hand to rotate filler cap 40 between open and closed positions. Since children generally cannot perform such a motion, filler cap 40 can be said to be resistant to tampering by children. Therefore, children and animals alike are prevented from accessing the bait in the bait station 10 via filler aperture 54.

Referring to FIG. 3, filler cap 40 is shown in an open position. Filling aperture 52 is additionally sealed by a plurality of resilient webs or webbing 58 contained therein. In a preferred embodiment, a plurality of quarter-circle webs 58 are employed, however it is appreciated that any number of webs 58 may be employed. Webbing 58 forms a shield, or semi-penetrable barrier, that allows a filling device, such as a nozzle or funnel, to be inserted into bait station 10 to add bait. Once filling means is removed, webbing 58 returns to its original, closed position, thus forming a barrier to filling aperture 54. Webbing 58 serves as an additional safety measure to prevent children or pets from obtaining access to bait within bait station 10, even if a child or pet is able to open filling cap 40. Any type of bait can be used to fill bait station 10, such as liquid, gel, paste, powder, or granular baits, which are known in the art. In a preferred embodiment, liquid bait such as that found in DR. MOSS'S LIQUID ANT AND ROACH BAIT SYSTEM™ is employed. This type of bait is disclosed in U.S. Pat. Nos. 5,667,816 and 5,871,780, both issued to James I. Moss, Ph.D.

Figure 4:
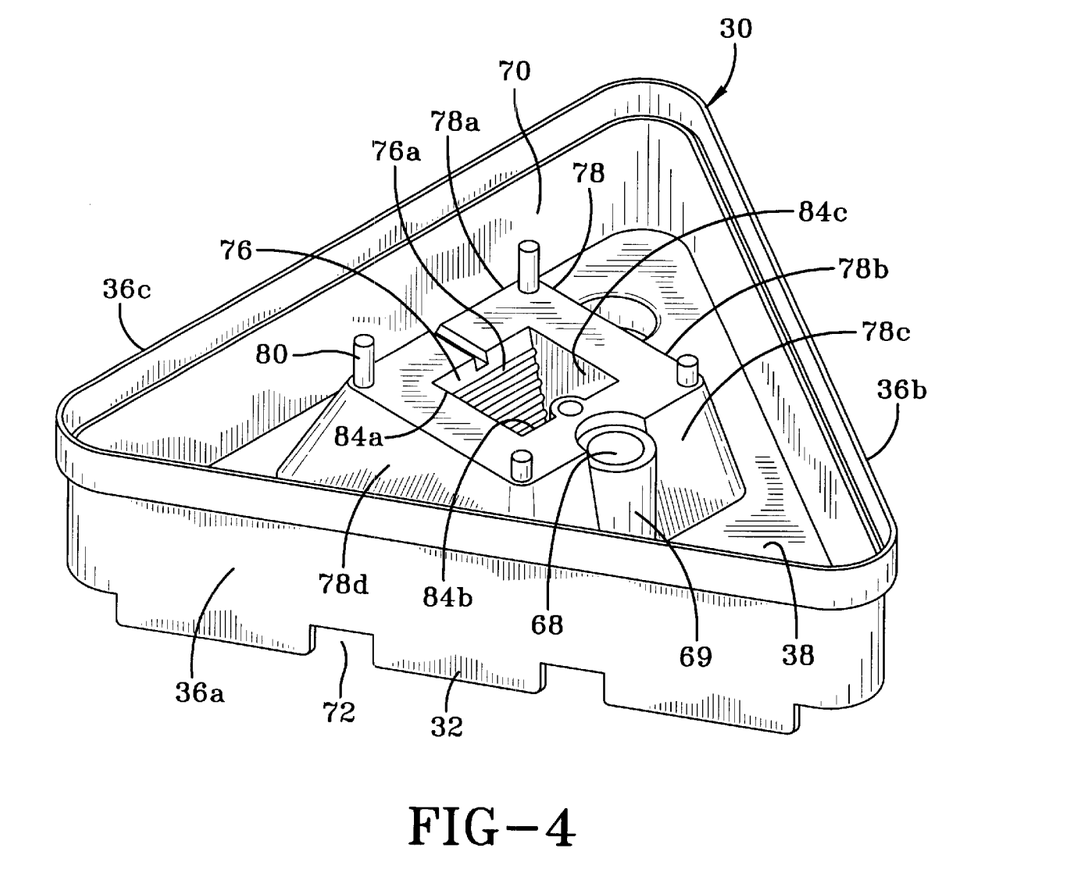
FIG. 4 is a perspective view of the interior chamber of the present invention shown in FIG. 1, with the floating feeding pad removed from the base.

Referring now to FIG. 4, bait station base 30 is shown and consists of first sidewall 36a, second sidewall 36b, and third sidewall 36c formed into a substantially triangular structure having a finite thickness, as mentioned above. First sidewall 36a, second sidewall 36b, and third sidewall 36c are preferably six inches in length and one inch in height. Alternatively, other shapes and dimensions of bait station base 30 can be formed via adding additional sidewalls to the structure. A bottom wall or floor 38 is coupled to the periphery of the lower edges of the resulting structure. The resulting structure of sidewalls 36a, 36b, and 36c with bottom wall 38 forms an interior chamber 70 into which bait can be added.

A plurality of supporting legs 32 protrudes downwardly from the bottom edges of sidewalls 36a, 36b and 36c. In other words, supporting legs 32 are formed in the same plane as first sidewall 36a, second sidewall 36b and third sidewall 36c, respectively. In the preferred embodiment, three legs 32 are employed per sidewall 36, each leg 32 separated by a peripheral access channel 72. A plurality of peripheral access channels 72 is thus formed via the separations between each leg 32 of bait station 10. The plurality of access channels 72 between adjacent legs 32 around the periphery of bait station base 30 allows insects to crawl beneath bait station base 30 to access bait within bait station interior chamber 70. Although the preferred embodiment is described having three supporting legs 32, it should be appreciated that any number of supporting legs 32 may be employed so as to create a raised bait station 10 having a plurality of access channels 72 thereon.

Interior chamber 70 further comprises an access ramp 76 to facilitate the ingress and egress of insects into and out of interior chamber 70 of bait station 10. In a preferred embodiment, access ramp 76 extends downwardly from the top of the interior of an access channel housing 78 so that base of access ramp 76 rests substantially on the same horizontal plane as base of supporting legs 32. In a preferred embodiment, access ramp 76 extends downwardly and is angled between about 45° and 90°, preferably 80°. A plurality of horizontal ribs 76a is located on the surface of access ramp 76. The plurality of horizontal ribs 76a serves to facilitate the ingress and egress of insects into and out of bait station 10 by providing a substantially frictional surface for insects to walk on.

Access channel housing 78 protrudes upwardly from the base of interior chamber 70 and is of a truncated pyramidal shape. Access channel housing 78 extends upwardly to a height that is substantially on the same horizontal plane as the top of sidewalls 36a, 36b and 36c. In a preferred embodiment, access channel housing outer sidewalls 78a,b,c,d extend downwardly from the top of access channel housing 78 to the bottom wall 38 of bait station 10. However, it should be appreciated that access channel housing outer sidewalls may be angled from about up to 90°.

Access channel housing 78 further consists of three additional interior sidewalls 84a, b, c which extend downwardly from top of access channel housing 78. In a preferred embodiment interior sidewalls 84a, b, c extend downwardly and are substantially perpendicular with top plane of access channel housing 78. However, it should be appreciated that any one of interior sidewalls may be angled at an angle substantially equal to that of access ramp 76 so as to serve as additional ramps for insect ingress and egress. Interior sidewalls 84a, b, c extend downwardly and are of a length less than the length of access ramp 76 so as to allow insects an unimpeded path to base of access ramp 76. Interior sidewalls 84a, b, c combine with access ramp 76 to define the hollow central access channel 74 in the center of access channel housing 78.

A plurality of projections 80 extends upwardly from the upper surface of access channel housing 78. In a preferred embodiment, four projections 80 are employed, one being on each corner of access channel housing 78. However, it is appreciated that any number of projections may be employed. Projections 80 serve as a securing means for a floating feeding pad 90 within interior chamber 70 of bait station 10. Floating feeding pad 90 will be discussed in greater detail infra.

Figure 5:
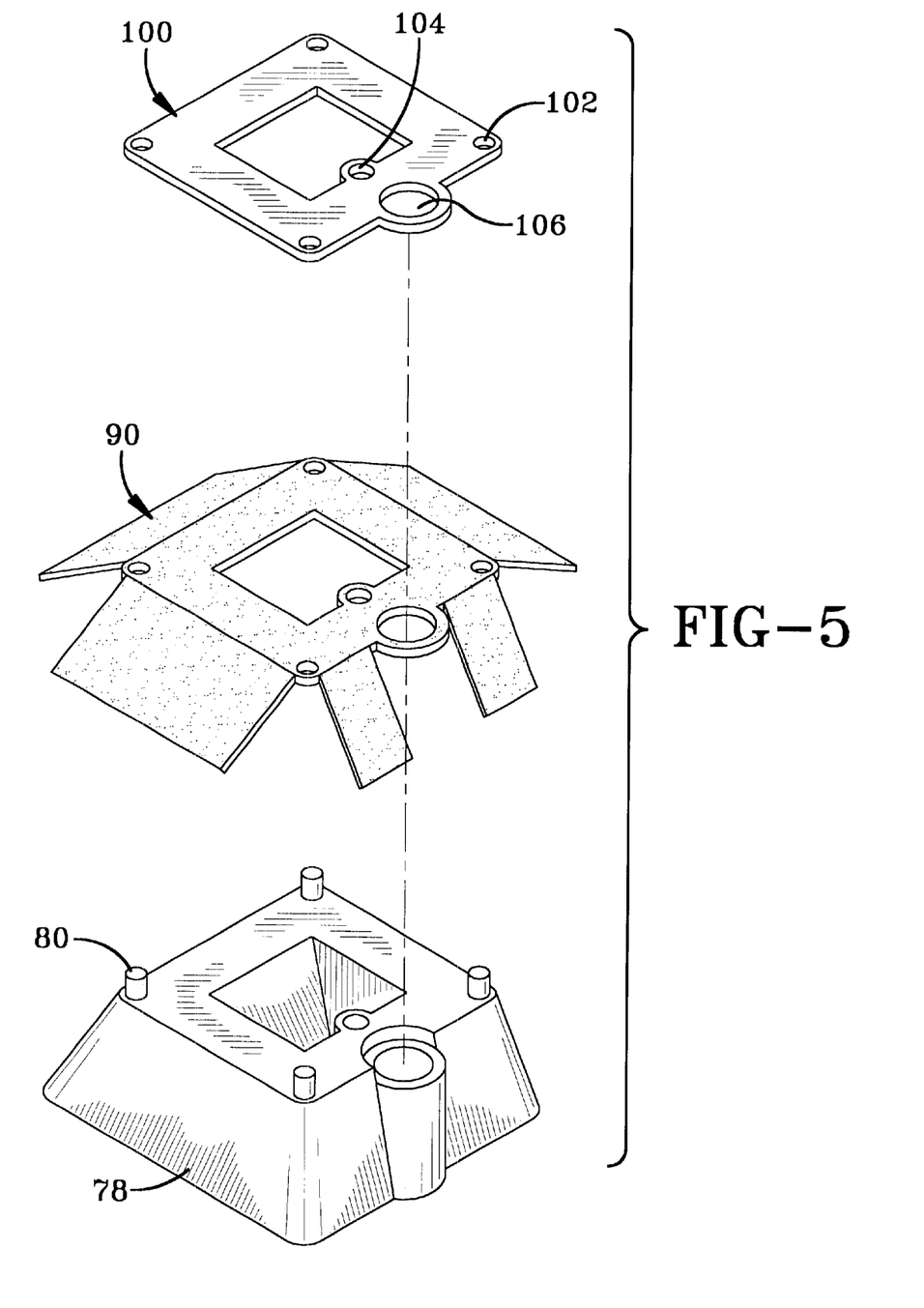
FIG. 5 is a perspective view of the central access channel housing and a securing device according to a preferred embodiment of the present invention, shown in exploded form.

In an alternative embodiment, referring to FIG. 5, a securing device 100, such as a gasket, may be employed to further secure floating feeding pad 90 to access channel housing 78. A plurality of apertures 102 is located on securing device 100 that correspond to the plurality of projections 80 extending upwardly from the surface of access channel housing 78. Projections 80 are removably engaged with securing device apertures 102 so securing device 100 is secured to access channel housing 78, thus securing floating feeding pad 90 in place between securing device 100 and access channel housing 78. In this embodiment, securing device 100 has four apertures 102 as shown with one aperture 102 per corner. However, it should be appreciated that any number of apertures 102 may be employed so as to correspond with the number of projections 80.

Securing device 100 further consists of a threaded aperture 104 to allow threaded post to pass therethrough. A second aperture 106 is present on securing device 100 to allow security stake 60 to pass therethrough. Security stake 60 will be discussed in greater detail infra. Securing device 100 can be made of plastic, rubber, or vinyl and designed into any desirable shape that corresponds to the shape of access channel housing 78.

Figure 6:
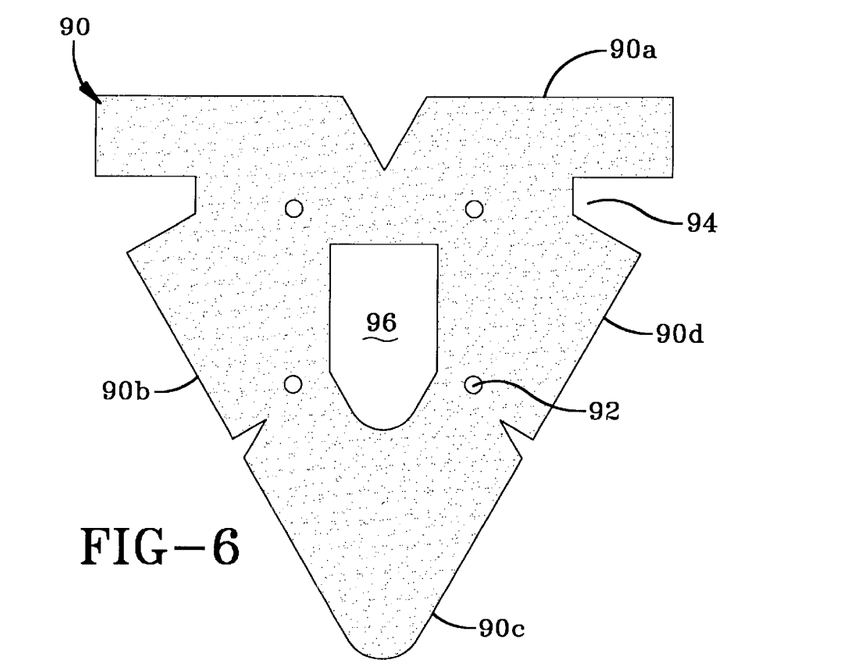
FIG. 6 is a top view of an inventive floating feeding pad for use in the invention shown in FIG. 1.

Referring now to FIG. 6, floating feeding pad 90 is shown. Feeding pad 90 consists of a plurality of leaves 90a, 90b, 90c, 90d extending outwardly from feeding pad central opening 96. Leaves 90a, 90b, 90c, 90d are separated from each adjacent leaf via a plurality of slits 94. Slits 94 allow the plurality of leaves 90a, 90b, 90c, 90d to float independently of each other in the liquid bait contained in the interior chamber 70, and further allows leaves 90a, 90b, 90c, 90d to conform to the shape of access channel housing 78. A plurality of apertures 92 is employed on feeding pad 90 to secure feeding pad 90 to access channel housing 78 via projections 80. A feeding pad central opening 96 is employed to facilitate the ingress and egress of insects into and out of bait station 10.

Figure 7:
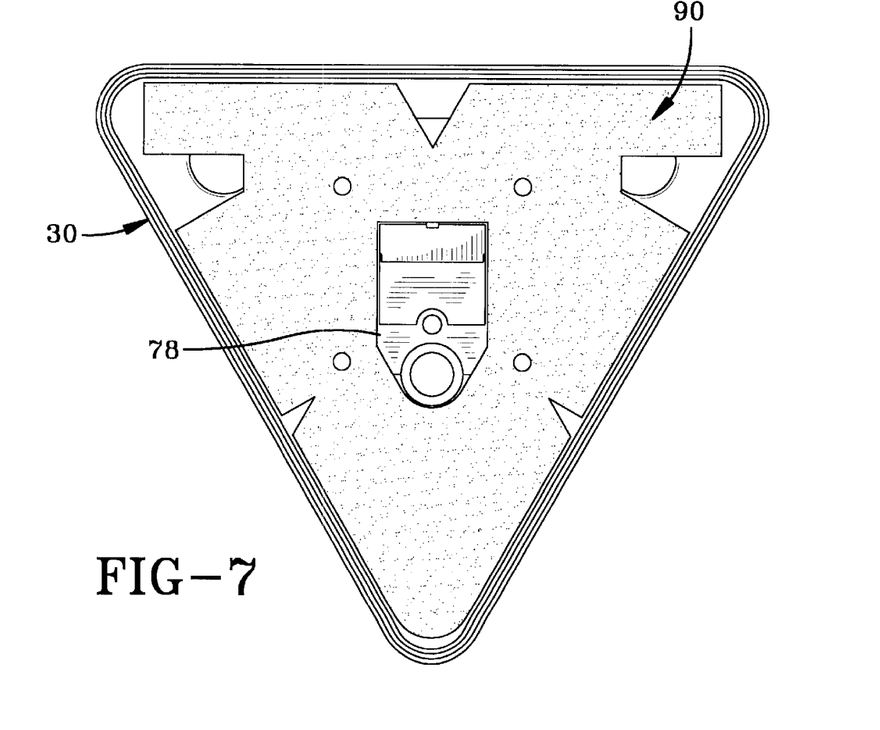
FIG. 7 is a top view of a portion of the invention shown in FIG. 1 showing the detail of the installation of the floating feeding pad secured to the base.

Referring to FIG. 7, feeding pad 90 is shown coupled to access channel housing 78 and having leaves 90a, 90b, 90c, 90d floating at the level of the liquid bait. To facilitate this, feeding pad 90 should be of a non-absorbent or absorbent material that is flexible, such as a foam, malleable plastic, hard plastic, fiberglass, fabric, a composite wood or other vegetable material or the like, yet strong enough to support the weight of insects traversing on it. Having leaves 90a, 90b, 90c, 90d float at the level of the liquid bait allows insects to reach the edge of feeding pad 90 to consume bait without the risk of becoming trapped in the bait. Becoming trapped in the liquid bait will result in the bait station 10 being cluttered with insect carcasses, and more importantly prevent the bait from being transported to the insect nest. It is preferred that the insects consume the bait and exit bait station 10. If the bait is a toxicant, it is preferred that the insects exit bait station 10 so they can transmit the toxicant to the insect nest so additional insects are exterminated.

Figure 8:
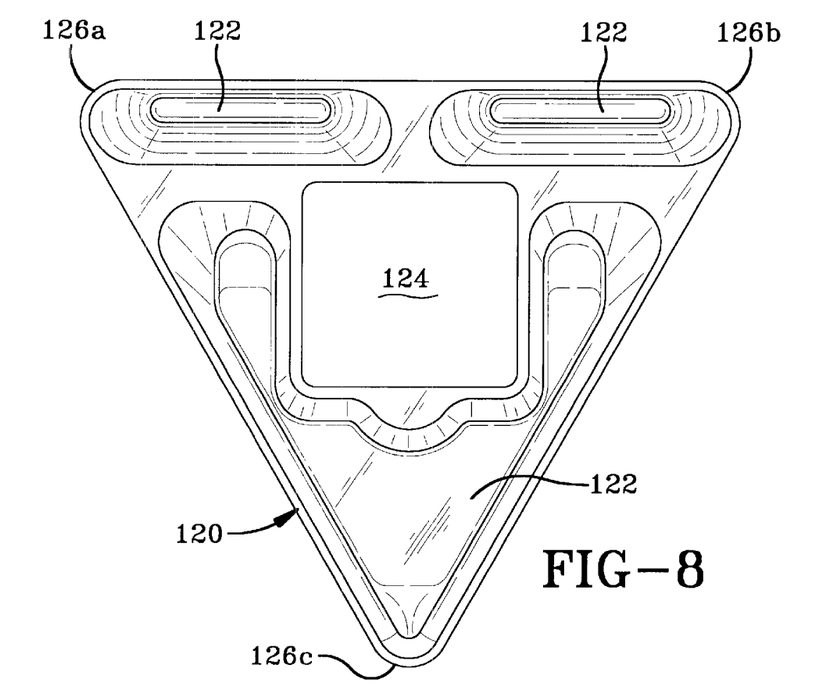
FIG. 8 is a top view of the multi-sectional reusable insert tray as shown in FIG. 1, shown in exploded form.

Referring to FIG. 8, an exploded view of a multi-sectional reusable insert tray 120 is shown. Insert tray 120 is a removable tray that is inserted into interior chamber 70 and is employed for the purposes of holding and dispensing of the bait therein. In a preferred embodiment, insert tray 120 is of substantially the same shape and dimensions of interior chamber 70 and having rounded corners 126a, b, c to correspond to the rounded corners 19a, b, c of bait station 10. However, it should be appreciated that insert tray 120 can be of any shape so as to correspond to the shape of bait station 10. Insert tray 120 should be of a material such as foam, malleable plastic, hard plastic, fiberglass, a composite wood or other vegetable material or the like, or other material that facilitates holding and dispensing of bait.

Insert tray 120 further consists of a plurality of separate wells 122. In a preferred embodiment, insert tray 120 contains three separate wells 122, however it should be appreciated that any number of separate wells 122 can be employed within the scope of the present invention.

The plurality of wells 122 serves to hold and dispense bait being employed in bait station 10. Wells 122 are separate so that a plurality of types of bait may be employed. For example, a user may simultaneously employ liquid bait, gel bait, and dry bait, or different types thereof, without the mixing of various baits. Insert tray 120 is removable so as to facilitate cleaning of insert tray 120, thus preventing a buildup of bait or other undesirable foreign matter within bait station 10.

Figure 9:
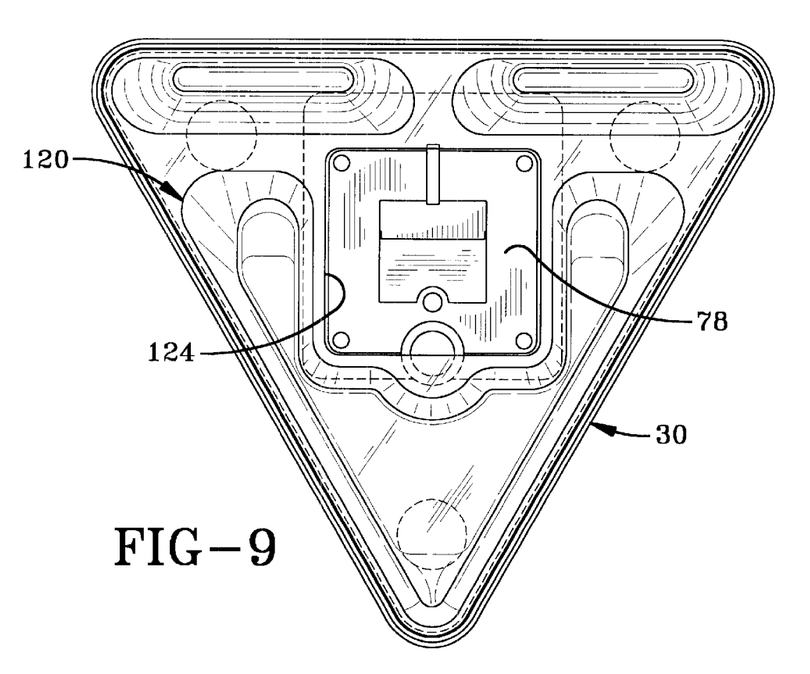
FIG. 9 is a top view of the lid of the invention as shown in FIG. 1, with the insert tray installed in place.

Referring to FIG. 9, insert tray 120 is shown installed inside interior chamber 70 of bait station 10. Insert tray 120 also comprises a central opening 124 to accommodate access channel housing 78 and projections 80. Feeding pad 90 is placed on top of insert tray 120 so feeding pad leaves 90a, b, c, d extend into the plurality of wells 122.

Figure 10:
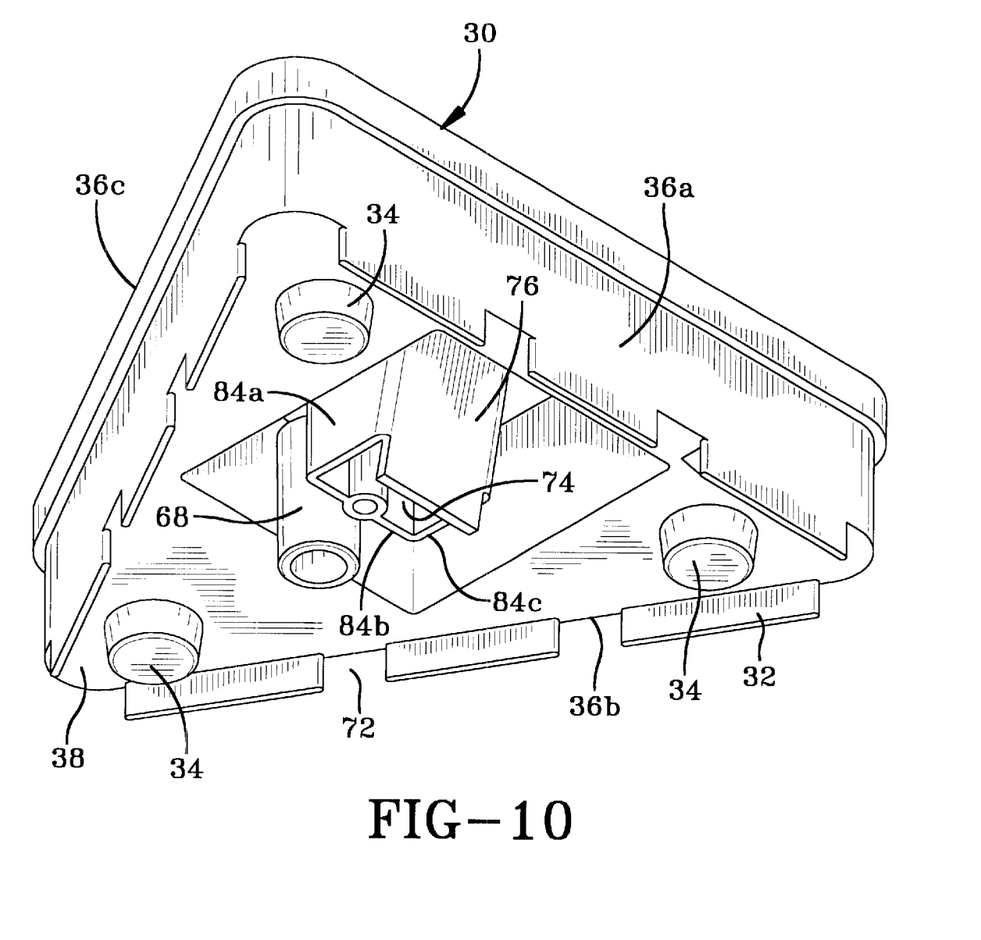
FIG. 10 is a perspective view of the under side of the housing of the present invention as shown in FIG. 1.

Referring now to FIG. 10, the underside of bait station base 30 is shown in greater detail. Access ramp 76 is shown extending downwardly from access channel housing 78. A plurality of support legs 32 is shown extending downwardly from sidewalls 36a, 36b, 36c with a plurality of peripheral access channels 72 therebetween. Insects, once attracted by bait within bait station 10, crawl through any one of peripheral access channels 72 to access ramp 76. Insects are able to crawl up access ramp 76 to floating feeding pad 90, whereby consumption of bait in bait station 10 is performed, as explained supra.

A plurality of protuberances 34 is provided which extend downwardly from the bottom wall 38 of bait station base 30. Protuberances 34 extend downwardly to substantially the same horizontal plane as legs 34. A user may apply an adhering substance, such as double-sided sticky tape, to the base of protuberances 34. Such application provides stable securement to bait station 10 when bait station 10 is employed on hard surfaces, such as concrete, tile floors, wood floors, and the like.

A security stake channel 68 is provided. Security stake channel 68 serves as a guide channel for security stake 60, which will now be explained in greater detail.

Figure 11:
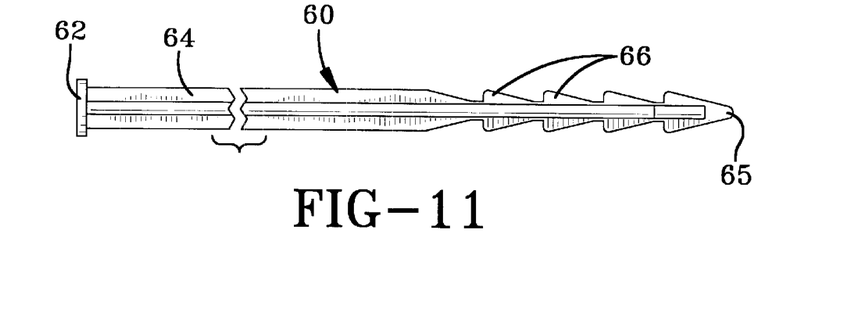
FIG. 11 is a side view of the security stake of the present invention shown in FIG. 1.

Referring to FIG. 11, a security stake is shown and referred to generally at numeral 60. Security stake 60 is employed for securing bait station 10 to the ground. When secured, security stake 60 prevents the displacement of bait station 10 from the desired location. Furthermore, security stake 60 prevents children or animals from transporting bait station 10 to alternative locations. In the preferred embodiment, security stake 60 has a length of about between 7 and 9 inches. However, it is appreciated that security stake 60 can be of any length adequate to secure bait station to the ground. Security stake 60 comprises a head 62, a fluted shaft 64, and a plurality of pointed retaining members 66 leading to a pointed tip 65, pointed tip 65 being on the end opposite that of head 62. Retaining members 66 extend outwardly from the fluted shaft 64 for securing security stake 60 in the ground. Retaining members 66 are angled so as to facilitate the piercing of the ground by security stake 60, while preventing security stake's movement in the opposite direction and keeping security stake 60 static in the ground.

Figure 12:
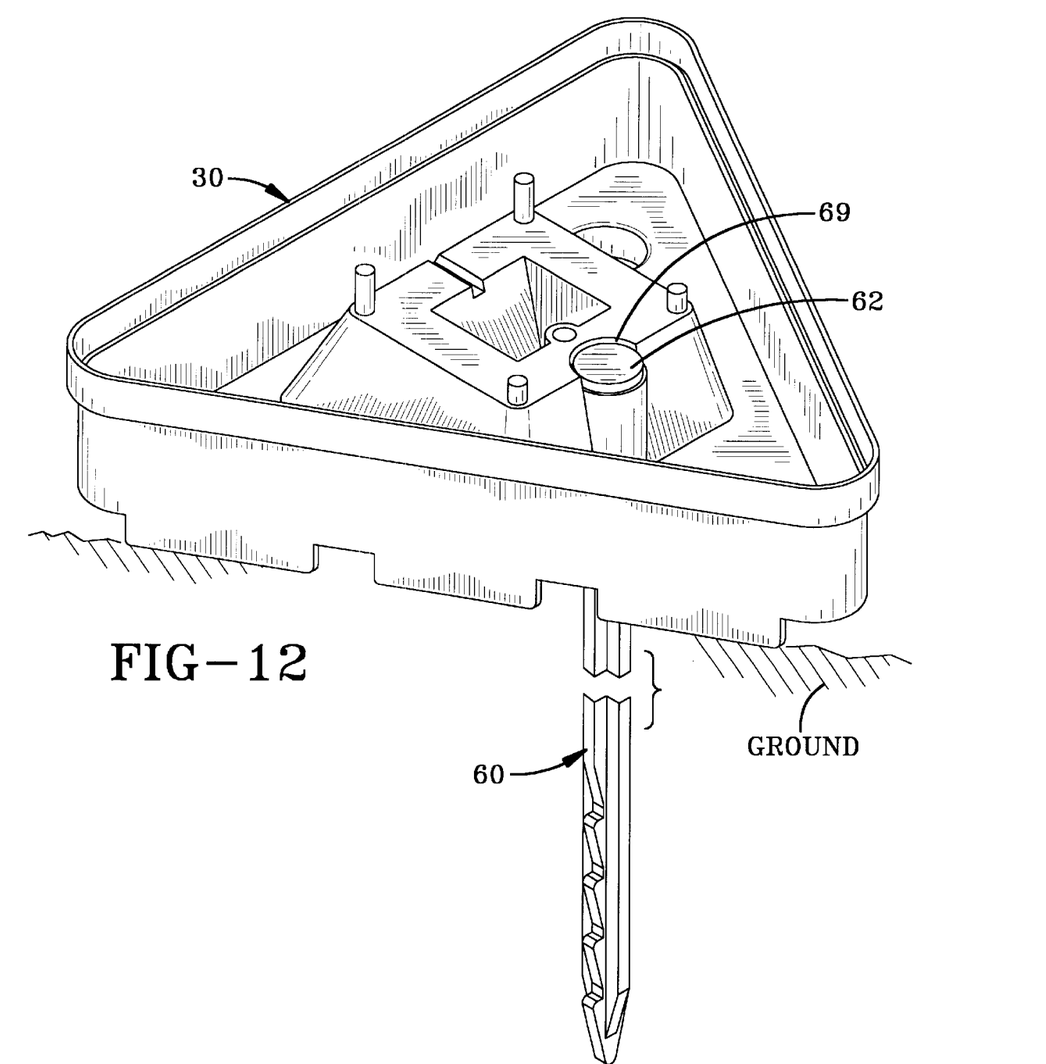
FIG. 12 is a side view of the invention of FIG. 1, with the security stake installed in place.

Security stake 60 is inserted into security stake channel 67 (FIG. 10) via security stake aperture 68 (FIG. 4), located on the top surface of access channel housing 78. A security stake recess 69 (FIG. 4) surrounds security stake aperture 68 (FIG. 4) and has a diameter greater than that of security stake aperture 68. Security stake head 62 is of a diameter substantially equal to that of security stake recess 69. When security stake 60 is fully inserted through bait station 10, head 62 engages recess 69 to prevent security stake 60 from fully traversing bait station 10, and preventing security stake 60 from becoming lodged within security stake channel 67. Referring to FIG. 12, a fully employed security stake 60 is shown with head 62 engaged with recess 69 and having fluted shaft 64 and retaining members 66 extend into the ground at a sufficient depth, ensuring that bait station 10 is secured to the ground.

Figure 13:
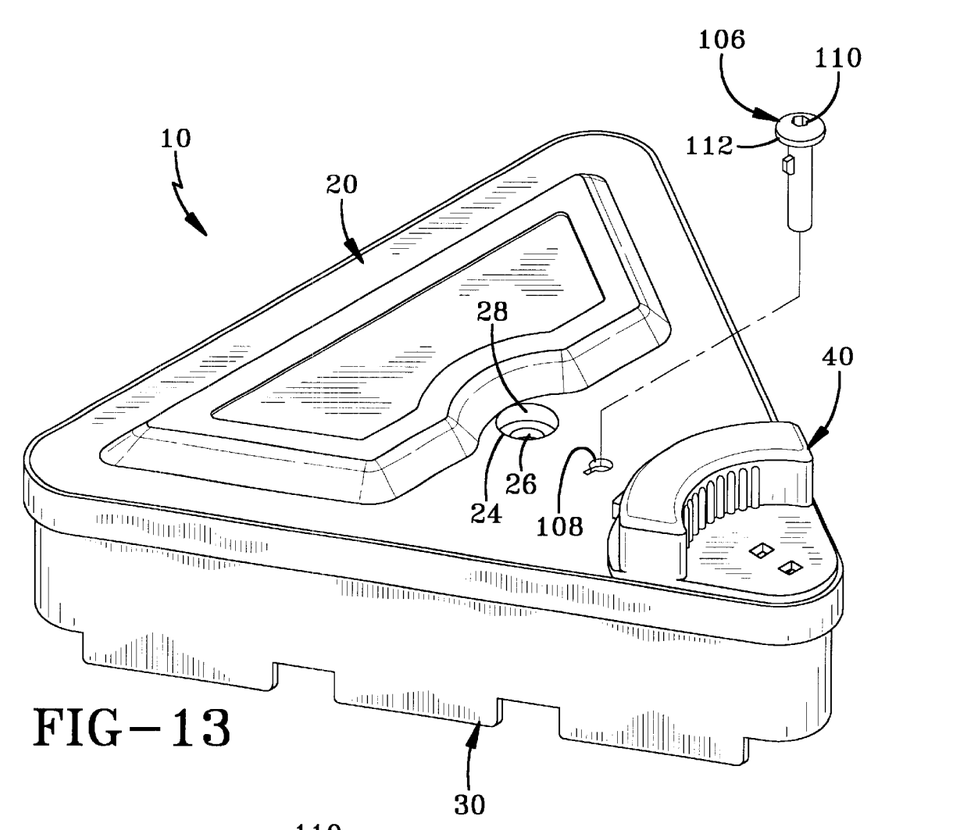
FIG. 13 is a top view of the invention of FIG. 1 showing the dipstick and dipstick aperture.

In an alternative embodiment where bait station lid 20 is permanently bonded to bait station base 30, bait station lid 20 may be adapted so security stake channel 67 extends downwardly therefrom. This adaptation would allow security stake 60 to be inserted through bait station 10 via security stake aperture 68 on bait station lid 20. In this alternative embodiment where bait station lid 20 is permanently bonded to bait station base 30, bait station lid 20 may further be adapted to have a dipstick aperture 108 (FIG. 13) whereby a dipstick 108 can be inserted so as to ascertain the amount of bait remaining in bait station 10.

Figure 14:
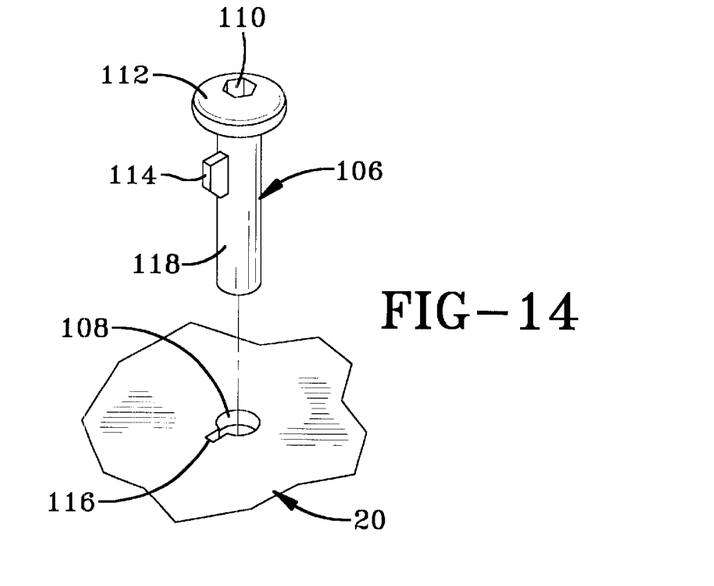
FIG. 14 is an exploded view of the invention of FIG. 1 showing the dipstick and dipstick aperture.

The dipstick and its aperture are shown in exploded form in FIG. 14. Dipstick 106 consists of a head 112 and a bait level testing rod 118 that projects downwardly from head 112. Rod 118 may have any cross-sectional shape, such as round or rectangular. Rod 118 extends downwardly into bait, and when removed, a user can determine the amount of bait remaining in bait station 10 by depth marks left on rod 118.

Dipstick 106 may be removed to check the bait level in the interior chamber 78. In this aspect, a cavity 110 is formed in the center of the upper surface of dipstick head 112 for receiving an "Allen" type wrench 29, as shown in FIG. 1b. The wrench 29 can be used when installing and removing dipstick 106 from lid 20. Head 112 can be flat or semi-spherically shaped to make it difficult to grab and turn dipstick 106 by hand. Dipstick head 112 can also be formed modified to receive other types of tools, such as screwdrivers, for installing and removing dipstick 106. A locking tab 114 (FIG. 14) is located on dipstick 106 and must be aligned with a locking tab groove 116 (FIG. 14) in lid 20. Once inserted into lid 20, dipstick 106 is rotated until locking tab 114 contacts a locking tab stop. Upon removal, dipstick 106 is rotated until locking tab is aligned with locking tab groove and dipstick 106 can be pulled upward. The design of dipstick 106 requiring the use of an "Allen" wrench 29 satisfies the Occupational Hazard Safety Requirements (OSHA) which requires that devices such as the present invention be tamper proof.

Figure 15:
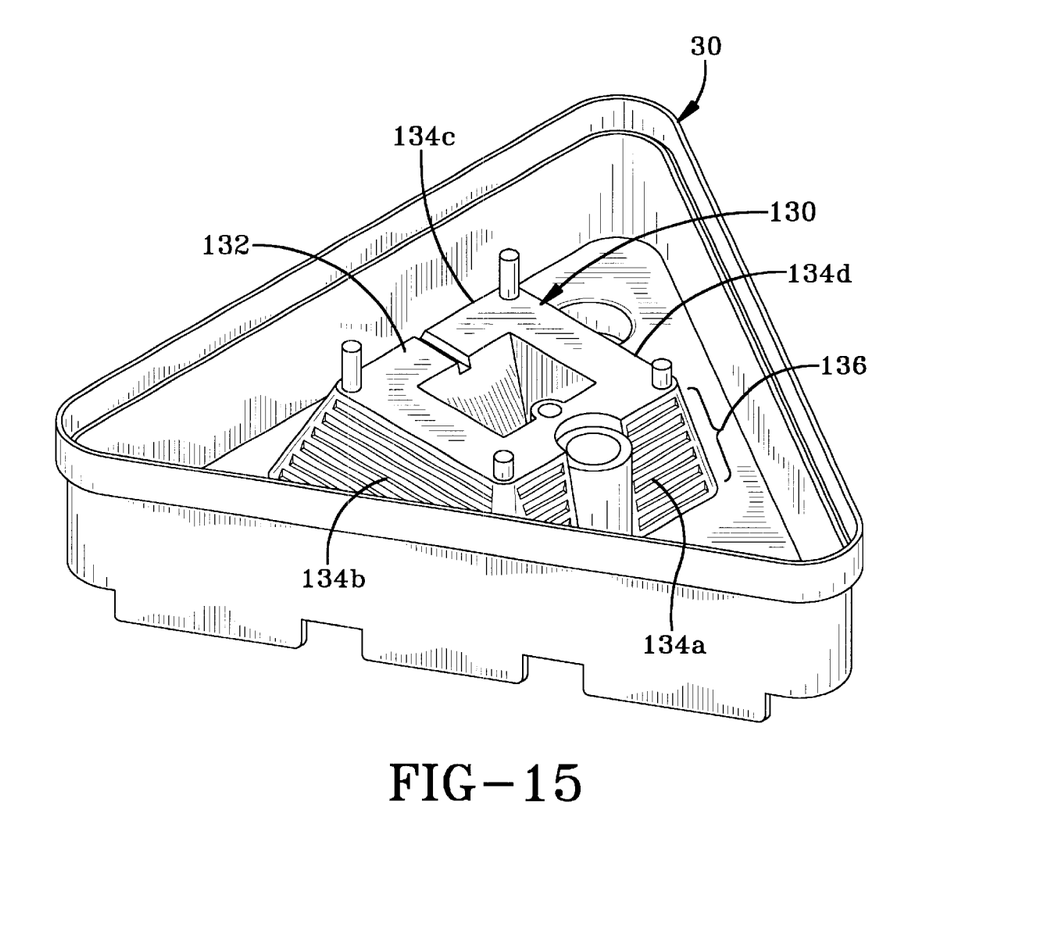
FIG. 15 is a top view of another embodiment of the invention similar to that illustrated in FIG. 1, showing a modified housing channel.

Referring now to FIG. 15, an alternative aspect of the present invention is shown. The bait station 10 of this aspect contains all the features of the bait station 10 in the aforementioned description, except for floating feeding pad 90. Bait station 10, in this aspect, contains a modified access channel housing 130 protruding from bait station base 30. Modified access channel housing 130 is of a truncated pyramidal shape and has a hollow center to accommodate central access channel 74. Modified access channel housing 130 has an upper surface 132 and a plurality of outer sidewalls 134a, b, c, d. Sidewalls 134a, b, c, d contain a plurality of horizontal ridges 136 to provide footing for the insects as they traverse into and out of bait station 10 from housing channel upper surface 132 to the level of bait.

This modified design further facilitates insect ingress and egress from bait station 10. Such design allows for a plurality of insects to access bait in bait station 10, and allows insects to access bait as the level of bait declines. Horizontal ridges 136 facilitate insect bait access, while preventing insects from becoming trapped or drowning in bait. Thus, insects are still able to leave bait station 10 for purposes of transporting toxic bait back to the insect nest.

Figure 16:
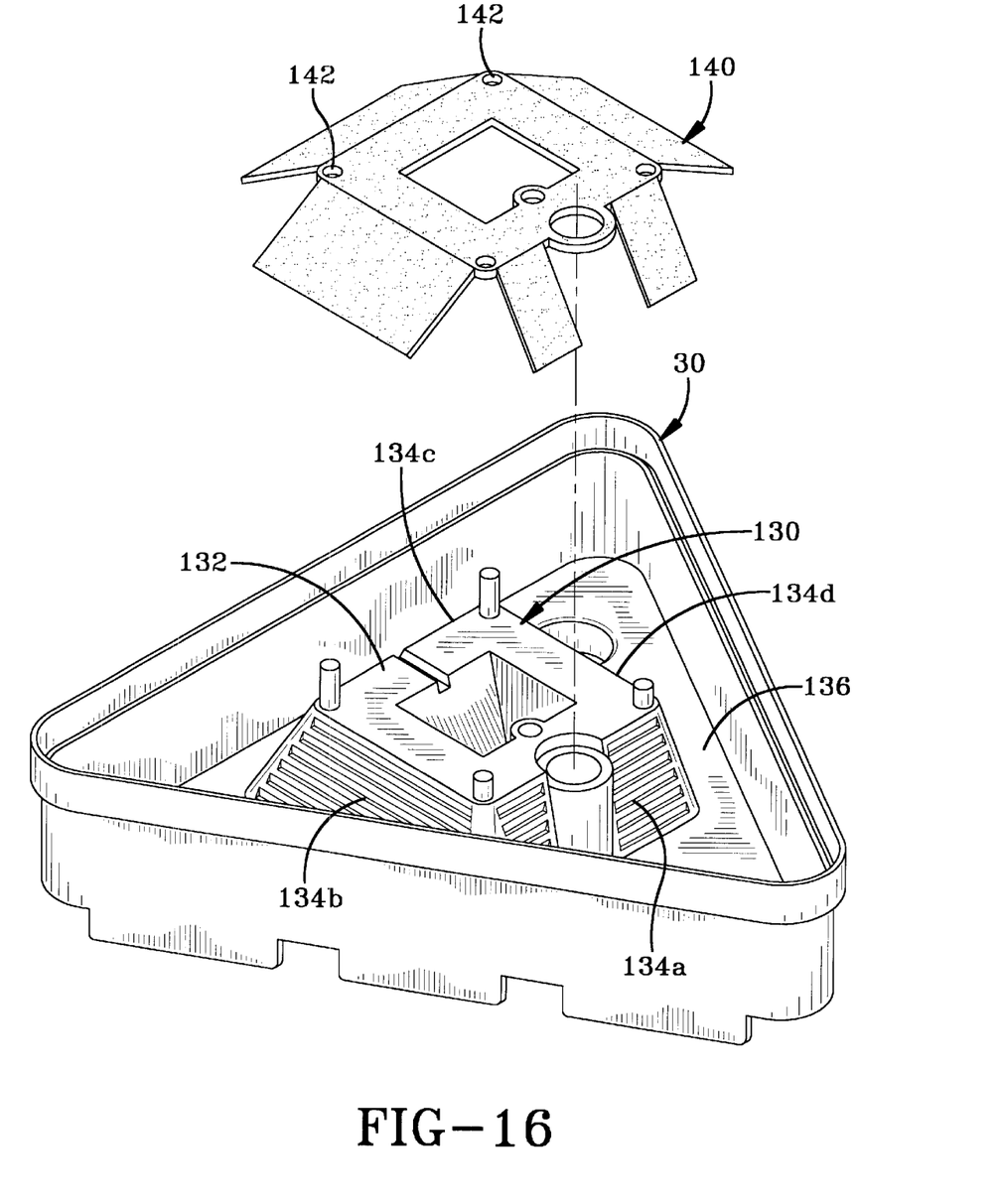
FIG. 16 is a top view of yet another embodiment of the invention of FIG. 1, showing a wick installed in place.

Referring now to FIG. 16, an optional wick 140 made from absorbent, textured material may be employed over modified housing 130 to draw liquid bait up sidewalls 134a, b, c, d while simultaneously providing footing for insects as they descend to the level of the bait. Wick 140 may be secured to modified housing 130 via a plurality of holes 142 that secure to corresponding projections 80 on modified housing channel 130.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

What is claimed is:

1. A floating feeding pad for use with a bait station having a lid, a base portion and an insert tray insertable into said base portion, said insert tray having at least one well, said base portion having a chamber for holding bait at a bait level, comprising:

a plurality of non-rigid independently floating leaves, each of which remains at or below said bait level, said feeding pad operatively coupleable to said base portion for providing insects access to and from said bait level, and from which insects may feed from said bait level, and wherein at least one of said plurality of leaves extends over any one of said at least one well and is in contact with the bait at said bait level when it is coupled to said base portion and bait is in said at least one well.

2. The floating feeding pad of claim 1 wherein the feeding pad is selected from the group consisting of foam, malleable plastic, hard plastic, fiberglass, fabric, a composite wood, or other vegetable material.

3. A non-absorbent floating feeding pad for use with a bait station having a lid, a base portion and an insert tray insertable into said base portion, said insert tray having at least one well, said base portion having a chamber for holding bait at a bait level, said pad comprising:

a plurality of non-rigid independently floating leaves, each of which floats at or below said bait level, said feeding pad operatively coupleable to said base portion for providing insects access to and from said bait level, and from which insects may feed from said bait level, and wherein at least one of said plurality of leaves extends over any one of said at least one well and is in contact with the bait at said bait level when it is coupled to said base portion and bait is in said at least one well.

4. An insect bait station, comprising:
a base having a chamber for receiving bait at a bait level and at least one access opening in said chamber to allow insects access into and out of said chamber having said bait level;
a lid to cover said base and to impede access by animals and children into said chamber, said lid able to receive bait therethrough for placement into said chamber;
an insert tray having the same configuration as said chamber, said tray insertable into said chamber and having at least one well for receiving bait; and
a non-absorbent floating feeding pad having a plurality of independently floating leaves each of which remains at or below said bait level, said feeding pad operatively coupled to said base for providing insects access to and from said bait level, and from which insects may feed from said bait level, and wherein at least one of said plurality of leaves extends over one of said at least one well and is in contact with the bait at said bait level when the bait is in said at least one well.

5. The insect bait station of claim 4, wherein said base has an upper portion and a lower portion, and further includes an access channel housing extending between said upper and lower portions.

6. The insect bait station of claim 5 wherein the access channel housing further comprises a central insect access channel extending through a central portion of said housing.

7. The insect bait station of claim 6 wherein the insect access channel is defined by at least one ramp providing the insects with access to said floating feeding pad for reaching and consuming the bait.

8. The insect bait station of claim 7 wherein the at least one ramp comprises a plurality of horizontal ridges.

9. The insect bait station of claim 7 wherein the at least one ramp has an angle greater than 0° and less than 90°.

10. The insect bait station of claim 9 wherein the at least one ramp has an angle of about 80°.

11. The insect bait station of claim 4, and further including a securing apparatus for holding said insect bait station in place.

12. The insect bait station of claim 11 wherein the securing apparatus is selected from the group consisting of a security stake extending from said base and adhesive material on said base.

13. The insect bait station of claim 4, and further including an aperture extending through said lid for receiving bait for transferring into said chamber.

14. The insect bait station of claim 13 and further including a closing device on said lid, said closing device being movable between an open position and a closed position for opening and sealing said aperture.

15. The insect bait station of claim 14 wherein the closing device is rotatable.

16. The insect bait station of claim 15 wherein the closing device is tamper-resistant.

17. The insect bait station of claim 4 wherein the base comprises a plurality of supporting legs.

18. The insect bait station of claim 17 wherein the plurality of supporting legs defines peripheral access channels for insects to gain access into and out of said bait station for accessing the bait.

19. The insect bait station of claim 4 wherein the insert tray is removable from said base.

20. The insect bait station of claim 4 wherein the feeding pad is made from a material selected from the group consisting of foam, malleable plastic, hard plastic, fiberglass, fabric, a composite wood, and vegetable material.

21. A system for attracting insects, comprising:
a triangular-shaped base having a chamber for receiving bait at a varying bait level, and at least one access opening to said chamber to allow insect ingress and egress to and from said chamber;
a lid to cover said base and impede access by animals and children to said chamber, through which bait is transferable to said chamber;
an insert tray having at least two feeding wells mountable into said chamber; and
an ingress and egress device operatively associated to said base for allowing insects to reach the bait for consumption at said bait level and providing access for insects to leave said bait level, thereby allowing the insects to leave said system after having consumed the bait, said device having a plurality of independently floating leaves that correspond to each of said wells to give insects access to and from each of said wells, and wherein said plurality of leaves are non-rigid so as to remain in contact with the bait at the varying bait level.

22. The system of claim 21, wherein the device is a floating feeding pad.

23. The system of claim 22 wherein the feeding pad is made from a material selected from the group consisting of foam, malleable plastic, hard plastic, fiberglass, fabric, a composite wood, and vegetable material.

24. The system of claim 21, wherein said base has an upper portion and a lower portion, and further includes an access channel housing extending between said upper and lower portions.

25. The system of claim 24, wherein the access channel housing further comprises a central insect access channel extending through a central portion of said housing.

26. The system of claim 25 wherein the insect access channel is defined by at least one ramp providing insects with access to said device for reaching and consuming the bait.

27. The system of claim 26 wherein the at least one ramp comprises a plurality of horizontal ridges.

28. The system of claim 26 wherein the ramp has an angle greater than 0° and less than 90°.

29. The system of claim 28 wherein the ramp has an angle of about 80°.

30. The system of claim 21, and further including a securing apparatus for holding said system in place.

31. The system of claim 30 wherein the securing apparatus is selected from the group consisting of security stake extending from said base and adhesive material on said base.

32. The system of claim 21, and further including an aperture extending through said lid for receiving bait for transfer to said chamber.

33. The system of claim 32 and further including a closing device on said lid movable between an open position and a closed position for opening and sealing said aperture.

34. The system of claim 33 wherein the closing device is rotatable.

35. The system of claim 34 wherein the closing device is tamper-resistant.

36. The system of claim 21 wherein the base comprises a plurality of supporting legs.

37. The system of claim 36 wherein the plurality of supporting legs defines peripheral access channels for insects to gain access to bait and to leave bait.

38. The system of claim 21 wherein the insert tray is removable from said base.

39. The system of claim 21 wherein the insert tray comprises at least two feeding wells for holding bait.

40. An insect bait station, comprising:

a base portion having a closed downward portion, an open upward portion and a chamber therebetween for receiving bait to a bait level;

a plurality of legs extending downwardly from said base portion; a plurality of protuberances extending downwardly from said base portion for adhering said bait station to a hard surface; an access channel housing extending upwardly from said base portion and comprising an access channel through a central portion of said housing, sidewalls, and a ramp; a plurality of projections extending upwardly from said access channel housing, an insert device defining at least two wells for receiving bait, and a floating feeding pad for providing insects with access to the bait for consumption and with access back to said access channel housing, said pad being operatively coupled to said base portion and having a plurality of leaves at or below said bait level;

a lid securable to said base portion having a filling aperture, a filling cap for sealing said filling aperture, and a securing device to secure said lid to said base; and a securing apparatus having at least one retaining member for holding said insect bait station to the ground.

41. The insect bait station of claim 40 wherein the ramp is ribbed.

42. The insect bait station of claim 40 wherein the ramp has an angle greater than 0° and less than 90°.

43. The system of claim 42 wherein the ramp has an angle of about 80°.

44. The insect bait station of claim 40 wherein the filling cap is secured to said lid by a prong extending downwardly from the underside of said filling cap and wherein said filling cap is rotatable around said prong.

45. The insect bait station of claim 40 wherein the filling cap is tamper-resistant.

46. The insect bait station of claim 40 wherein the at least one retaining member of said securing apparatus is angled so as to facilitate entry of said securing apparatus into the ground while preventing the upward movement of said securing apparatus.

47. The insect bait station of claim 40 wherein the floating feeding pad is selected from the group consisting of foam, malleable plastic, hard plastic, fiberglass, fabric, a composite wood, and vegetable material.

48. The insect bait station of claim 40 wherein the floating feeding pad further comprises independently floating leaves.

\* \* \* \* \*